United States Patent [19]

Bez

[11] Patent Number: 4,630,858
[45] Date of Patent: Dec. 23, 1986

[54] MULTI-PURPOSE PASSENGER MOTOR VEHICLE, ESPECIALLY STATION WAGON

[75] Inventor: Ulrich Bez, Poecking, Fed. Rep. of Germany

[73] Assignee: Bayerische Motoren Werke AG, Munich, Fed. Rep. of Germany

[21] Appl. No.: 739,023

[22] Filed: May 29, 1985

[30] Foreign Application Priority Data

May 30, 1984 [DE] Fed. Rep. of Germany ....... 3420349

[51] Int. Cl.⁴ .............................................. B60J 1/18
[52] U.S. Cl. .................................... 296/146; 296/216
[58] Field of Search ............... 296/146, 216, 210, 56

[56] References Cited

U.S. PATENT DOCUMENTS 3,333,889 8/1967 Golde ................................. 296/146
4,272,121 6/1981 Kim ..................................... 296/216

FOREIGN PATENT DOCUMENTS 1288929 2/1969 Fed. Rep. of Germany.

OTHER PUBLICATIONS

Automobile Review, No. 21, dated May 2, 1968, p. 3.

Primary Examiner—Robert R. Song
Attorney, Agent, or Firm—Craig & Burns

[57] ABSTRACT

A multi-purpose passenger motor vehicle with a rear door that accommodates a lowerable rear window. The rear roof section is movably arranged, preferably in the form of a sliding roof. The rear door is pivotally connected in the upper rear end areas of the vehicle body. This vehicle is characterized by a greater utilization area.

15 Claims, 4 Drawing Figures

MULTI-PURPOSE PASSENGER MOTOR VEHICLE, ESPECIALLY STATION WAGON

The present invention relates to a multi-purpose passenger motor vehicle, especially a station wagon with a rear door accommodating a lowerable window and with a rear movable roof section, against which abuts the rear window in the closed condition.

Such a passenger motor vehicle is disclosed in the publication, "Karosserie und Fahrzeugbau", Year 12, Volume 9 of September, 1959, pages 16 to 18. In this vehicle, the rear door is pivotally connected within the bottom area of the side walls. As a result thereof, it requires a relatively large amount of free space during the opening which, however, does not always exist, for example, when vehicles are parked closely one behind the other. In such a case, the opening of the rear door is impaired, if not completely precluded.

The vehicle of this type is suited particularly well for the transportation of bulky goods. If, however, these goods are heavy, as is the case, for example, in connection with a refrigerator or a washing machine, then a further disadvantage results from the downwardly pivotal rear door. For, before this cargo can be pushed into the vehicle interior, it has to be at first placed or deposited on the pivoted-out rear door, respectively, the rear door is loaded by the weight. The rear door must therefore be constructed very solid, especially within the area of its hinges. This measure increases the cost of the vehicle and therebeyond increases the weight thereof. If one dispenses with a reinforced construction of the rear door, the danger exists that a user of the vehicle during loading of such a heavy cargo damages the vehicle. Additionally, the accessibility into the interior space is impaired by the folded-down door.

It is the object of the present invention to so further develop a multi-purpose passenger motor vehicle of the aforementioned type that it can be loaded without problems also in case of constricted space conditions and in which the danger does not exist that the rear door may be damaged when loading heavy goods.

The underlying problems are solved according to the present invention in that the rear door is pivotally connected at the upper rear end areas of the vehicle body by means of two arms serving as window frame for the rear window.

Owing to these measures, the vehicle can also be loaded when it is parked in a short parking space. Furthermore, it can be loaded directly because the rear door no longer stands in the way for that purpose. The usefulness of the vehicle is considerably increased as a result thereof.

A passenger motor vehicle is already disclosed in the publication, "mot", Volume 1 of Jan. 4, 1984, page 68, having a rear door pivotally connected at the top. However, the usefulness of this vehicle is considerably limited because the size of the cargo is limited and with large goods projecting beyond the roof edge, the rear door can no longer be closed. The passenger motor vehicle according to the present invention does not entail this disadvantage.

A multi-purpose passenger motor vehicle is provided by the combination of the features in accordance with the present invention which, in addition to the types of usage customary for a passenger motor vehicle, offers further utilization possibilities such as the loading and transporting of bulky goods without problems.

During the loading of such a bulky good, which in its size exceeds the interior height of the passenger cell, at first the rear window is lowered, the rear door is pivoted upwardly, and the rear roof section is removed. As a result of and by reason of the absent roof cross-connection, a direct access to the vehicle will open up which is nearly unlimited in the upward direction. The accessibility is not rendered difficult by a pivoted-down rear door as with the known vehicle. If the cargo is stored in the vehicle, the rear door with the lowered rear window can be pivoted into the closing position over the cargo. This again is not possible with the vehicle illustrated in the publication, "mot."

Generally, the pivoting of the rear door is a pure rotary movement. In certain applications, however, a translatory movement may additionally be superimposed on this rotary movement.

In an advantageous construction according to the present invention, the rear window can be lowered automatically as soon as the rear door is opened. In this case, it is appropriate to provide means with which this automatic mechanism can be turned off.

A further advantage compared to the vehicle described in the publication, "mot", resides in the possibility to achieve a good ventilation in the vehicle interior with a closed rear door, in that the rear roof section is removed. This rear roof section may be constructed as sliding or folding roof. However, it is also possible to provide the same as removable lid or also as a combination of sliding roof and removable lid. It is pointed out that from an overall point of view, a multi-passenger motor vehicle is provided by the combination of the various features according to the present invention, which may be found individually in the prior art, but which offers a considerably enlarged utilization area compared to the known vehicles. This can be traced back in particular to the mutually complementary, advantageous cooperation of each individual feature of the overall combination.

In one advantageous embodiment, the present invention provides an elevated roof that is adapted to be secured on the vehicle roof, properly speaking. As a result of this elevated roof, bulky goods can also be transported. Even though with this type of goods, limits exist in this case, the advantage is realized nonetheless that the vehicle is closed during the transport. It is appropriate to pivotally connect the elevated roof with its forward section at the vehicle roof. In that case, it can be slightly erected during loading. However, the elevated roof can also be securely connected with the vehicle roof, for example, by way of rapid fastening devices of any known type. In this case, it is advantageous if it includes an upwardly pivotal flap or lid in the rear section which facilitates the loading. Such a flap or lid may, of course, also be provided for the pivotally connected construction.

In an appropriate manner, the elevated roof covers the section of the vehicle roof that is removable. However, it may also be appropriate to extend the same forwardly. In that case, a further payload space is formed which may serve, for example, for storing skis. The vehicle roof thereby forms the bottom of this payload space. However, it is also possible to provide at the elevated roof a bottom separate from the vehicle roof.

These and other objects, features and advantages of the present invention will become more apparent from the following description when taken in connection with the accompanying drawing which shows, for purposes of illustration only, two embodiments in accordance with the present invention, and wherein.

Figure 1:
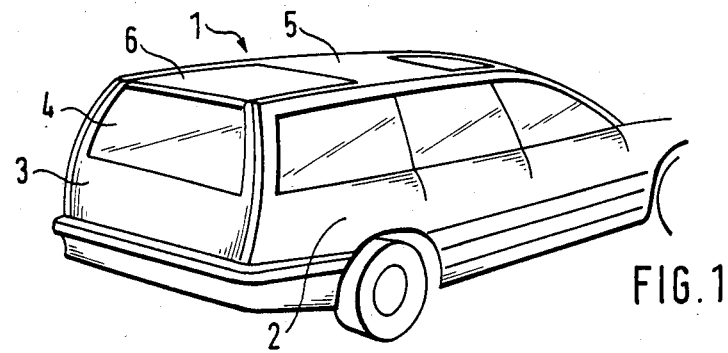
FIG. 1 is a partial perspective view of a passenger motor vehicle in accordance with the present invention with a closed rear door.
Figure 2:
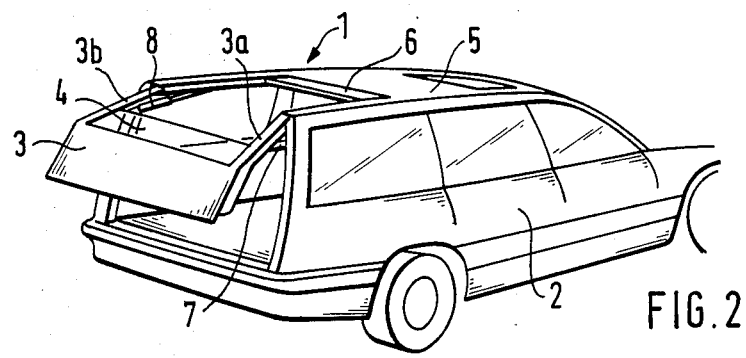
FIG. 2 is a partial perspective view of the same passenger motor vehicle with half-open rear door and sliding roof.

Referring now to the drawing wherein like reference numerals are used throughout the various views to designate like parts, and more particularly to FIGS. 1 and 2, these two figures illustrate a multi-passenger motor vehicle 1 which is constructed as station wagon. The vehicle body 2 includes a rear door 3 which accommodates a lowerable rear window 4. The vehicle roof 5 is subdivided into a fixed forward fixed section and a movable rear roof section 6. The roof section 6 is constructed as sliding roof which can be opened forwardly in the driving direction.

Both the roof section 6 as also the rear window 4 are closed in FIG. 1. In this condition, they abut sealingly at one another. In FIG. 2, these two parts are illustrated almost completely opened. Additionally, this figure illustrates the rear door 3 in the half-open condition. As a result thereof, the arms 3a and 3b of the rear door 3 can be recognized, by means of which the rear door 3 is pivotally connected at the upper rear end areas of the vehicle body 2, and more precisely at the side walls thereof. The arms 3a and 3b additionally serve as window frames for the rear window 4. Pneumatic springs 7 and 8 of conventional type facilitate the opening and closing of the rear door 3.

The multi-purpose passenger motor vehicle 1 can be utilized in the condition according to FIG. 1 as normal passenger motor vehicle. The roof section 6 can be slightly opened. As a result thereof, one obtains a good ventilation of the passenger interior space.

In FIG. 2, the user of the vehicle is just about to prepare the vehicle for transporting a bulky item, for example, a bicycle. As already mentioned, the roof section 6 and the rear window 4 are nearly in their open position. By a further pivoting of the rear door 3 in the upward direction, the cargo to be transported can be loaded conveniently into the vehicle 1. Thereafter, the rear door 3 is pivoted downwardly over the cargo and closed.

Figure 3:
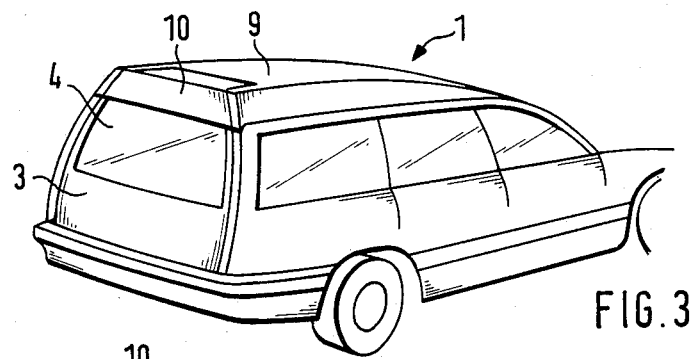
FIG. 3 is a partial perspective view of a modified embodiment of a passenger motor vehicle in accordance with the present invention with installed elevated roof.
Figure 4:
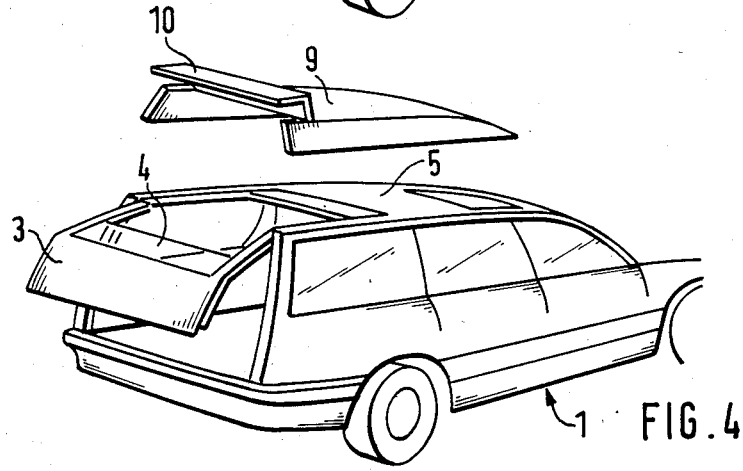
FIG. 4 is a partial perspective, exploded view of the vehicle according to FIG. 3 with a half-open rear door.

FIGS. 3 and 4 illustrate in principle the same multi-purpose passenger motor vehicle 1, except that it carries an elevated roof 9. In FIG. 4, for reasons of easier understanding, the elevated roof 9 is shown separate from the vehicle roof 1. The elevated roof 9 can be fastened at the vehicle roof 5, properly speaking, by means of any conventional rapid-fastening or closure devices (not shown). Additionally, it includes at its rear section an upwardly pivotal flap or lid 10 which, in its closed condition, cooperates with the upwardly moved window 4 as shown in FIG. 3. This cooperation may thereby be a mere sealing of the vehicle interior space. However, it is also possible that the upper edge of the rear window 4 enters into a corresponding receiving channel of the lid 10 and thereby secures the same against unauthorized opening.

If the vehicle is equipped with this elevated roof, the roof section 6 is appropriately in its opened condition. An enlarged payload volume which is closed against the outside results therefrom which is sufficient, for example, for the transport of the mentioned bicycles. If the rear section 6 is closed, then elongated objects such as skis can be stored in the payload space between vehicle roof 5, respectively, roof section 6 and the elevated roof 9.

While I have shown and described only two embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A multi-purpose passenger motor vehicle, comprising a rear door including a rear window means lowerable into the door, roof means including a movable rear roof section, against which the closed rear window means abuts, vehicle side walls devoid of any roof connection between the rear upper sections thereof, and means pivotally connecting the rear door in the upper rear end areas of the vehicle body side walls including two arms serving as window frame means for the rear window means, and wherein the upper pivotal ends of the two arms are unconnected with each other to define an open area with an area occupied by the movable roof section when the window is lowered and the roof section is moved.

2. A passenger motor vehicle according to claim 1, wherein the multi-passenger motor vehicle is a station wagon.

3. A passenger motor vehicle according to claim 1, wherein the movable roof section is constructed as removable roof part.

4. A passenger motor vehicle according to claim 1, wherein the movable roof section is constructed as combined sliding roof and removable roof structure.

5. A passenger motor vehicle according to claim 1, wherein the connecting means includes hinge means for the rear door enabling a rotary movement thereof.

6. A passenger motor vehicle according to claim 1, further comprising means for automatically lowering the rear window during opening of the rear door.

7. A multi-purpose passenger motor vehicle, comprising a rear door including a lowerable rear window means, roof means including a movable rear roof section, against which the closed rear window means abuts, vehicle side walls devoid of any roof connection between the rear upper sections thereof, means pivotally connecting the rear door in the upper rear end areas of the vehicle body including two arms serving as window frame means for the rear window means, and further comprising an elevated roof means adapted to be fastened on the vehicle roof.

8. A passenger motor vehicle according to claim 7, wherein the elevated roof means is pivotally arranged with its forward section at the vehicle roof.

9. A passenger motor vehicle according to claim 7, wherein the elevated roof means includes a rear upwardly pivotal lid means which in its closed condition cooperates with the raised rear window means.

10. A passenger motor vehicle according to claim 9, wherein the elevated roof means is pivotally arranged with its forward section at the vehicle roof.

11. A passenger motor vehicle according to claim 5, wherein the movable roof section is constructed as removable roof part.

12. A passenger motor vehicle according to claim 5, wherein the movable roof section is constructed as combined sliding roof and removable roof structure.

13. A passenger motor vehicle according to claim 7, further comprising means for automatically lowering the rear window during opening of the rear door.

14. A passenger motor vehicle according to claim 7, wherein the movable roof section is constructed as removable roof part.

15. A passenger motor vehicle according to claim 13, wherein the elevated roof means includes a rear upwardly pivotal lid means which in its closed condition cooperates with the raised rear window means.

* * * * *